(12) United States Patent
Hirakata

(10) Patent No.: US 11,894,791 B2
(45) Date of Patent: Feb. 6, 2024

(54) CONTROL DEVICE, MOTOR DRIVING APPARATUS, AND MOTOR DRIVING SYSTEM

(71) Applicant: FUJI ELECTRIC CO., LTD., Kanagawa (JP)

(72) Inventor: Masaki Hirakata, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/664,954

(22) Filed: May 25, 2022

(65) Prior Publication Data
US 2023/0020544 A1    Jan. 19, 2023

(30) Foreign Application Priority Data

Jul. 15, 2021    (JP) .................................. 2021-117232

(51) Int. Cl.
| | |
|---|---|
| *H02H 7/08* | (2006.01) |
| *H02P 29/024* | (2016.01) |
| *B60L 3/00* | (2019.01) |
| *B60L 50/51* | (2019.01) |

(Continued)

(52) U.S. Cl.
CPC .......... *H02P 29/024* (2013.01); *B60L 3/0061* (2013.01); *B60L 50/51* (2019.02); *H02P 6/08* (2013.01); *H02P 27/085* (2013.01); *B60L 2240/423* (2013.01)

(58) Field of Classification Search
CPC ........ H02P 29/024; H02P 6/08; H02P 27/085; H02P 29/028; H02P 27/06; H02P 2101/45; B60L 50/51; B60L 3/0061; B60L 2240/423

See application file for complete search history.

(56) References Cited

U.S. PATENT DOCUMENTS

| | | |
|---|---|---|
| 6,239,566 B1 | 5/2001 | Tareilus et al. |
| 2007/0249461 A1 | 10/2007 | Tsuji et al. |

(Continued)

FOREIGN PATENT DOCUMENTS

| | | |
|---|---|---|
| JP | 2000-014184 | 1/2000 |
| JP | 2007-312588 | 11/2007 |
| JP | 2016-039696 | 3/2016 |

(Continued)

OTHER PUBLICATIONS

Office Action dated Nov. 9, 2021 issued with respect to the basic Japanese Patent Application No. 2021-117232.

*Primary Examiner* — Karen Masih
(74) *Attorney, Agent, or Firm* — IPUSA, PLLC

(57) ABSTRACT

A control device includes a control circuit configured to control an inverter circuit that drives a motor by a plurality of switching elements coupled between DC buses, a first power supply system using a voltage source different from the DC buses as a power supply, a second power supply system using the DC buses as a power supply, and a switching circuit configured to switch a power supply system that supplies power to the control circuit from the first power supply system to the second power supply system when an abnormality in the first power supply system is detected. The control circuit continues control of the inverter circuit with a power consumption lower than that before the abnormality is detected in the first power supply system, when the abnormality is detected.

19 Claims, 13 Drawing Sheets

(51) Int. Cl.
*H02P 6/08* (2016.01)
*H02P 27/08* (2006.01)

(56) References Cited

U.S. PATENT DOCUMENTS

2016/0043670 A1  2/2016  Nakamura et al.
2019/0190294 A1  6/2019  Sato et al.

FOREIGN PATENT DOCUMENTS

| JP | 2017-081348 | 5/2017 | |
|---|---|---|---|
| JP | 2019-110713 | 7/2019 | |
| WO | WO-2021161794 A1 * | 8/2021 | .............. H02J 9/062 |

* cited by examiner

CONTROL DEVICE, MOTOR DRIVING APPARATUS, AND MOTOR DRIVING SYSTEM

CROSS-REFERENCE TO RELATED APPLICATIONS

This application is based upon and claims priority to Japanese Patent Application No. 2021-117232, filed on Jul. 15, 2021, the entire contents of which are incorporated herein by reference.

BACKGROUND OF THE INVENTION

1. Field of the Invention

The present disclosure relates to control devices, motor driving apparatuses, and motor driving systems.

2. Description of the Related Art

In a motor driving system for driving a motor of an electric vehicle, such as a hybrid vehicle or the like, using an inverter device, it is known to operate a fail-safe circuit in the event of some kind of a failure in a component of the system, in the event of an emergency such as a collision of the vehicle, or the like. This fail-safe circuit operates a semiconductor switching element of an inverter main circuit to short-circuit windings of the motor, or discharges a capacitor connected between positive and negative direct current (DC) buses, for example. The fail-safe circuit is required to have a high reliability, so as to continuously protect the system from damage, and to ensure safety of passengers.

In this type of motor driving system, an inverter control circuit including the fail-safe circuit is generally supplied with power from a low voltage power supply (hereinafter also referred to as a "first power supply") of 12 [V], for example, that is used as an auxiliary power supply. The inverter control circuit includes a central processing unit (CPU) for motor control, a current sensor for the motor, or the like. When the first power supply described above is unavailable due to a failure or the like, the power supply to the fail-safe circuit is cut off, and the fail-safe circuit becomes inoperable. As a countermeasure, for example, Patent Document 1 (Japanese Laid-Open Patent Publication No. 2000-14184), for example, discloses a technique for providing redundancy of the power supplied to the inverter control circuit including the fail-safe circuit.

FIG. 13 is a circuit diagram of a motor driving system described in Patent Document 1. In FIG. 13, 51 denotes a main battery (hereinafter also referred to as a "second power supply") of 400 [V], for example, 52 denotes an isolated DC/DC converter, 53 denotes an operation state detector, 54 denotes a first power supply, 60 denotes an inverter control circuit including a fail-safe circuit, 61 denotes a switching element for discharging a capacitor 63 connected to DC buses, 62 denotes a bridge circuit famed by semiconductor switching elements 62a through 62f, and M denotes a three-phase motor.

In this prior art, a voltage of the first power supply 54, and a voltage obtained by isolating and stepping down the voltage of the second power supply 51 by the DC/DC converter 52 (both voltages being 12 [V]), are supplied to the inverter control circuit 60 under an OR condition. The redundancy of the power supplied to the fail-safe circuit within the inverter control circuit 60 is provided in this manner. As a result, the reliability of a fail-safe operation in the event of an emergency (such as the short-circuiting of the windings of the motor M caused by the switching elements 62a through 62c on an upper arm or the switching elements 62d through 62f on a lower arm that turn on, the discharge of the capacitor 63 caused by the switching element 61 that turns on, or the like) is improved.

When an abnormality, such as the failure or the like, occurs in the first power supply system, power is supplied to the fail-safe circuit within the inverter control circuit from the second power supply system which is different from the first power supply system, thereby making it possible to protect the system by the fail-safe operation. However, when a power supply capacity of the second power supply system is made equivalent to a power supply capacity of the first power supply system so that the motor can continue to operate in the event of the abnormality in the first power supply system, a size of the second power supply system may become large.

SUMMARY OF THE INVENTION

The present disclosure provides a control device, a motor driving apparatus, and a motor driving system capable of continuing to operate the motor in the event of the abnormality in the first power supply system, while enabling the size of the second power supply system to be reduced.

According to a first aspect of the present disclosure, a control device includes a control circuit configured to control an inverter circuit that drives a motor by a plurality of switching elements coupled between DC buses; a first power supply system using a voltage source different from the DC buses as a power supply; a second power supply system using the DC buses as a power supply; and a switching circuit configured to switch a power supply system that supplies power to the control circuit from the first power supply system to the second power supply system when an abnormality in the first power supply system is detected, wherein the control circuit continues control of the inverter circuit with a power consumption lower than that before the abnormality is detected in the first power supply system, when the abnormality is detected.

According to a second aspect of the present disclosure, a motor driving apparatus includes the control device, and the inverter circuit.

According to a third aspect of the present disclosure, a motor driving system includes the motor driving apparatus, and the motor.

Other objects and further features of the present invention will be apparent from the following detailed description when read in conjunction with the accompanying drawings.

DESCRIPTION OF THE PREFERRED EMBODIMENTS

Hereinafter, embodiments of the present disclosure will be described.

Figure 1:
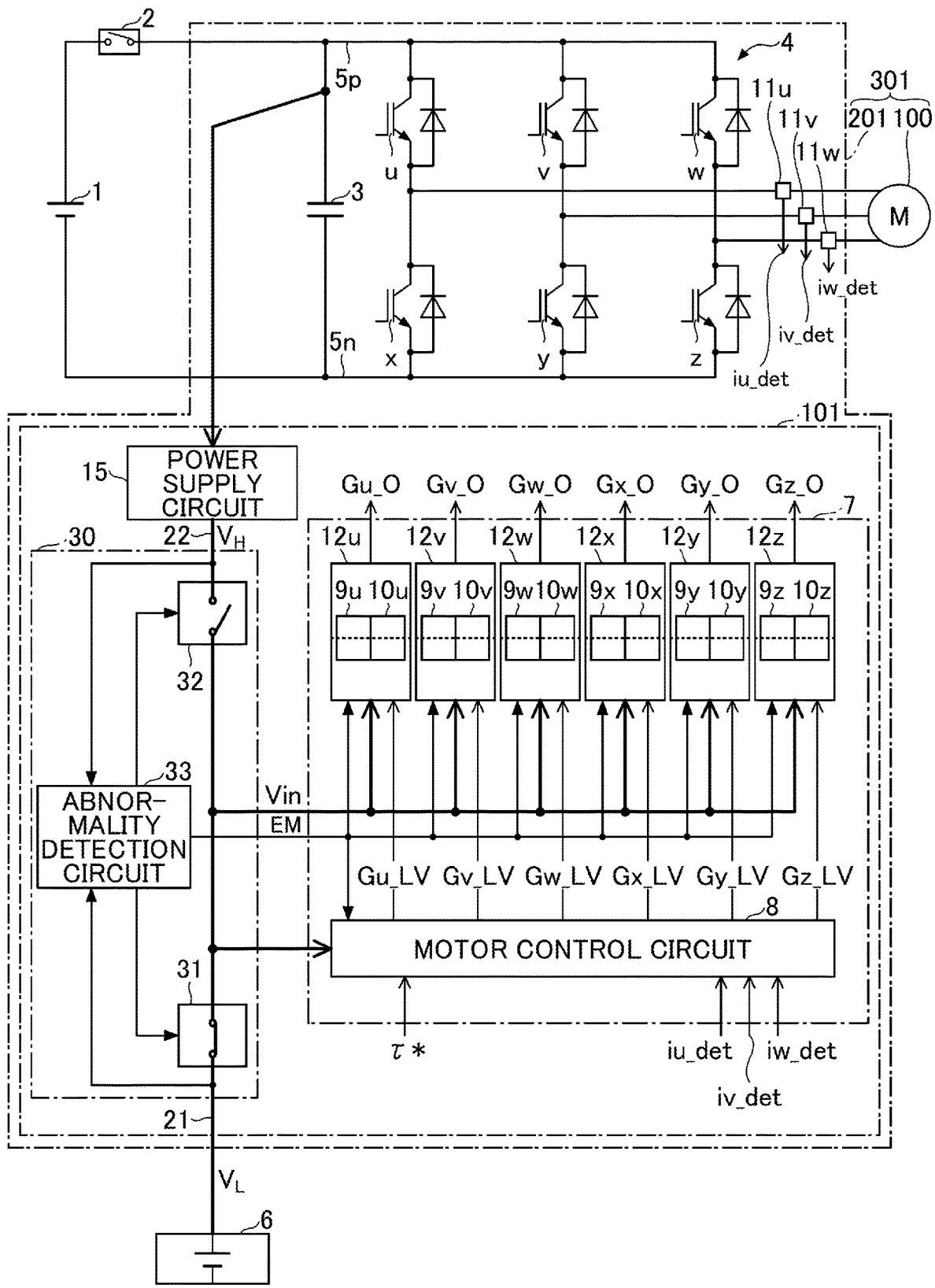
FIG. 1 is a diagram illustrating a configuration example of a motor driving system according to a first embodiment.

FIG. 1 is a diagram illustrating a configuration example of a motor driving system according to a first embodiment. A motor driving system 301 illustrated in FIG. 1 drives a motor 100 using power supplied from the main battery 1 through a main switch 2. The main battery 1 is a power supply that supplies a voltage higher than a voltage supplied from an auxiliary battery 6 which will be described later, and may be a high-voltage battery that supplies a voltage of approximately 400 [volts (V)], for example.

The motor driving system 301 is provided in a vehicle, and drives the motor 100 that is used to run the vehicle. The motor driving system 301 drives the vehicle to run by power that is generated by driving the motor 100. A number of motor driving systems 301 provided in the vehicle may be more than one in order to rotate a plurality of wheels by multiple motors 100.

The motor driving system 301 includes a motor 100, and a motor driving apparatus 201. The motor driving apparatus 201 drives the three-phase motor 100 by a three-phase alternating current (AC). The motor driving apparatus 201 includes an inverter circuit 4, and a control device 101.

The inverter circuit 4 is a bridge circuit formed by a plurality of switching elements u, v, w, x, y, and z connected between DC buses 5p and 5n. The inverter circuit 4 converts a DC voltage of the capacitor 3, that is connected between the DC buses 5p and 5n, into an AC voltage, by the switching of the plurality of switching elements u, v, w, x, y, and z, to thereby drive the motor 100 by the three-phase AC. The capacitor 3 is charged by the power supplied from main battery 1, or power regenerated from motor 100 through the inverter circuit 4.

The control device 101 controls the inverter circuit 4 so as to drive the motor 100. The control device 101 includes a control circuit 7, a first power supply system 21, a second power supply system 22, and a switching circuit 30, for example.

The control circuit 7 is an inverter control circuit configured to control the inverter circuit 4. The control circuit 7 causes a torque, corresponding to a torque command τ*, to be generated by controlling a current (motor current) supplied to the motor 100 by the inverter circuit 4 according to the torque command τ* that is supplied from outside. The motor current is a current that flows between the inverter circuit 4 and the motor 100.

The first power supply system 21 uses a voltage source different from the DC buses 5p and 5n as a power supply. In this example, the auxiliary battery 6 is used as the power supply of the first power supply system 21. The first power supply system 21 supplies DC power from the auxiliary battery 6 to internal portions of the control device 101. The auxiliary battery 6 is a voltage power supply that supplies a voltage lower than the voltage supplied from the main battery 1, and may be a low voltage battery that supplies a power supply voltage $V_L$ of approximately 12 [V], for example. The first power supply system 21 may include a voltage conversion circuit (not illustrated) that steps down the voltage of the auxiliary battery 6 and supplies the stepped down voltage to the internal portions of the control device 101.

The second power supply system 22 uses the DC bus lines 5p and 5n as a power supply. In this example, the capacitor 3 is used as the power supply of the second power supply system 22. The second power supply system 22 steps down the DC power from the capacitor 3, and supplies the stepped down power to the internal portions of the control device 101. In this example, the second power supply system 22 includes a power supply circuit 15 that steps down the DC power from the capacitor 3, and supplies the stepped down power to the internal portions of the control device 101.

The power supply circuit 15 supplies DC power of a power supply voltage $V_H$, lower than the voltage of the capacitor 3, to the internal portions of the control device 101. The power supply voltage $V_H$ is a DC voltage of 12 [V], for example, that is higher than a minimum operating voltage of the control circuit 7 and the switching circuit 30, and is lower than or equal to the power supply voltage $V_L$. The power supply circuit 15 is an insolated DC/DC converter, for example.

The switching circuit 30 switches the power supply system that supplies power to the control circuit 7 from the first power supply system 21 to the second power supply system 22, when an abnormality such as a failure or the like of the first power supply system 21 is detected. Accordingly, even when the abnormality is generated in the first power supply system 21, power can be supplied from the second power supply system 22 to the control circuit 7, so that the power supply to the control circuit 7 is ensured. Accordingly, even when the abnormality is generated in the first power supply system 21, the control circuit 7 can perform a fail-safe operation by the inverter circuit 4 utilizing the power supplied from the second power supply system 22, so as to safely stop the motor 100.

When the abnormality such as the failure or the like of the first power supply system 21 is detected, the control circuit 7 according to the present embodiment continues the control of the inverter circuit 4 with a power consumption lower than that before the abnormality is detected. For this reason, because the power supplied from the second power supply system 22 to the control circuit 7 decreases in the event of the abnormality in the first power supply system 21, it is possible to continue the operation of the motor 100 in the event of the abnormality in the first power supply system 21, to thereby extend the time in which the operation of the motor 100 is continued.

In the present embodiment, the control of the inverter circuit 4 is continued with the power consumption lower than that before the abnormality in the first power supply system 21 is detected. Hence, even without increasing a power supply capacity of the second power supply system 22, it is possible to continue the operation of the motor 100 in the event of the abnormality in the first power supply system 21, to thereby extend the time in which the operation of the motor 100 is continued. In addition, even without increasing a power supply capacity of the second power supply system 22, it is possible to continue the operation of the motor 100 in the event of the abnormality in the first power supply system 21. For this reason, it is possible to reduce the size of the second power supply system 22 (particularly the power supply circuit 15), and consequently, to thereby reduce the size of the control device 101, the motor driving apparatus 201, and the motor driving system 301.

In applications such as a powertrain of the vehicle or the like, continuity of the operation (limp home function), that reduces outputs of the inverter circuit 4 and the motor 100 in the event of the abnormality in the first power supply system 21 or the like, is required. According to the present embodiment, because the control of the inverter circuit 4 is continued with the power consumption lower than that before the abnormality in the first power supply system 21 is detected, it is possible to extend the time in which the operation of the motor 100 is continued, to thereby facilitate enabling the limp home function.

The switching circuit 30 monitors the power supply voltage $V_L$ of the first power supply system 21, and detects an abnormal drop in the power supply voltage $V_L$ as the abnormality in the first power supply system 21, for example. Accordingly, when the abnormal drop in the power supply voltage $V_L$ is generated in the first power supply system 21, the control circuit 7 continues the control of the inverter circuit 4 in a power save mode in which the power consumption is lower than that before the abnormal drop is generated, and thus, it is possible to continue the operation of the motor 100 for a relatively long time. Specific examples of the abnormal drop in the power supply voltage $V_L$ include unavailability of the auxiliary battery 6 due to a failure or the like (which may include breaking of a power harness from the auxiliary battery 6 to the control unit 101). In this specification, an abnormality refers to a variation of the voltage or current exceeding a tolerable range, and for example, refers to a drop or change (abnormal drop) of the voltage or current to a value lower than a threshold value within a predetermined time.

The switching circuit 30 receives the supply of power from at least one of the first power system 21 and the second power system 22. For this reason, even when the power supply from the first power supply system 21 is cut off due to an abnormality in the first power supply system 21, the switching circuit 30 can utilize the power supplied from the second power supply system 22, and switch the power supply system that supplies the power to the control circuit 7 from the first power supply system 21 to the second power supply system 22.

The power supply system that supplies the power to the switching circuit 30 may be switched from the first power supply system 21 to the second power supply system 22 when an abnormality in the first power supply system 21 is detected. Thus, the switching circuit 30 can utilize the power supplied from the first power supply system 21, to monitor the presence or absence of the abnormality in the first power supply system 21. When the abnormality in the first power supply system 21 is detected, the switching circuit 30 can utilize the power supplied from the second power supply system 22, and switch the power supply system that supplies the power to the control circuit 7 from the first power supply system 21 to the second power supply system 22.

The switching circuit 30 includes an abnormality detection circuit 33, a first switch 31, and a second switch 32, for example.

The abnormality detection circuit 33 utilizes the power supplied from the first power supply system 21 or the second power supply system 22, to monitor the presence or absence of the abnormality in the first power supply system 21. The abnormality detection circuit 33 turns off the first switch 31 and turns on the second switch 32 when the abnormality in the first power supply system 21 is detected. A power supply path between the first power supply system 21 and the control circuit 7 is disconnected when the first switch 31 is turned off, and a power supply path between the second power supply system 22 and the control circuit 7 is connected when the second switch 32 is turned on. Hence, when the abnormality in the first power supply system 21 is detected, the power supply system that supplies the power to the control circuit 7 can be switched from the first power supply system 21 to the second power supply system 22.

The abnormality detection circuit 33 may monitor the power supply voltage $V_L$ of the first power supply system 21, by utilizing the power supplied from the first power supply system 21 or the second power supply system 22. When the abnormality detection circuit 33 detects the power supply voltage $V_L$ lower than a predetermined threshold value, the abnormality detection circuit 33 may perform a switching operation to turn off the first switch 31 and turn on the second switch 32.

At a stage before detecting the abnormality in the first power supply system 21, a power supply voltage $V_{in}$ of the control circuit 7 is the power supply voltage $V_L$ supplied from the first power supply system 21 through the first switch 31. At a stage after detecting the abnormality in the first power supply system 21, the power supply voltage $V_{in}$ of the control circuit 7 is the power supply voltage $V_H$ supplied from the second power supply system 22 through the second switch 32.

When the abnormality in the first power supply system 21 is detected, the switching circuit 30 switches the power supply system that supplies power to the control circuit 7 from the first power supply system 21 to the second power supply system 22, and outputs an abnormality detection signal EM of the first power supply system 21 from the abnormality detection circuit 33. The abnormality detection signal EM is a signal indicating that an abnormality in the first power supply system 21 is detected. The abnormality detection signal EM is supplied to the control circuit 7. The control circuit 7 recognizes that the abnormality in the first power supply system 21 is detected, responsive to the input of the abnormality detection signal EM. When the abnormality detecting signal EM is input, the control circuit 7 continues the control of the inverter circuit 4 in a power save mode in which the power consumption is lower than that before the abnormality is detected.

In the example illustrated in FIG. 1, the control circuit 7 includes a motor control circuit 8, and a gate driving circuit 12 including gate driving circuits 12u, 12v, 12w, 12x, 12y, and 12z.

The motor control circuit 8 outputs drive commands Gu_LV, Gv_LV, Gw_LV, Gx_LV, Gy_LV, and Gz_LV with respect to the gate driving circuits 12u, 12v, 12w, 12x, 12y, and 12z, respectively, according to the external torque command τ* from the outside. The drive command with respect to the gate driving circuit is a pulse width modulation (PWM) signal, for example. The gate driving circuits 12u, 12v, 12w, 12x, 12y, and 12z output gate drive voltages Gu_O, Gv_O, Gw_O, Gx_O, Gy_O, and Gz_O according to the corresponding drive commands Gu_LV, Gv_LV, Gw_LV, Gx_LV, Gy_LV, and Gz_LV supplied thereto, respectively. The gate driving circuits 12u, 12v, 12w, 12x, 12y, 12z drive gates of the corresponding switching elements u, v, w, x, y, and z by the gate drive voltages Gu_O, Gv_O, Gw_O, Gx_O, Gy_O, and Gz_O, respectively. As a result, a torque corresponding to the torque command τ* is generated.

The motor control circuit 8 may use detection values iu_det, iv_det, and iw_det of the motor current of each phase for the generation of the drive commands Gu_LV, Gv_LV, Gw_LV, Gx_LV, Gy_LV, and Gz_LV. The motor control circuit 8 acquires the detection values iu_det, iv_det, and iw_det of the motor current of each phase from current sensors 11u, 11v, and 11w that detect the motor current of each phase, respectively.

The motor control circuit 8 includes a memory, and a processor such as a central processing unit (CPU), for example. Functions of the motor control circuit 8 are realized by operations of the processor that executes a program stored in the memory. The motor control circuit 8 is a microcomputer including a memory, and a processor, for example.

The gate driving circuit 12u includes a buffer circuit 10u configured to output the gate drive voltage Gu_O based on the drive command Gu_LV, and a gate power supply circuit 9u configured to generate a gate power supply voltage required by the buffer circuit 10u to output the gate drive voltage Gu_O. The other gate driving circuits 12v, 12w, 12x, 12y, and 12z have the same configuration as gate driving circuit 12u, and include buffer circuits 10v, 10w, 10x, 10y, and 10z, and gate power supply circuits 9v, 9w, 9x, 9y, and 9z, respectively.

When an abnormality in the first power supply system 21 is detected, the control circuit 7 may continue the control of the inverter circuit 4 with a modulation scheme having a power consumption lower than that before the abnormality is detected. Accordingly, because the power supplied from the second power supply system 22 to the control circuit 7 is reduced in the event of the abnormality in the first power supply system 21, the control circuit 7 can make the power supply capacity of the power supply circuit 15 smaller than that of the first power supply system 21. For this reason, it is possible to reduce the size of the power supply circuit 15. For example, when the abnormality detection signal EM is input to the motor control circuit 8, the motor control circuit 8 continues the control of the inverter circuit 4 with a modulation scheme having a power consumption lower than that before the abnormality detection signal EM is input.

When the abnormality in the first power supply system 21 is detected, the motor control circuit 8 of the control circuit 7 may continue the control of the inverter circuit 4 with a pulse width modulation scheme having a frequency lower than that before the abnormality is detected (control method 1). Alternatively, when the abnormality in the first power supply system 21 is detected, the motor control circuit 8 of the control circuit 7 may continue the control the inverter circuit 4 with a two-phase modulation scheme (or binary phase modulation) scheme having a power consumption lower than that before the abnormality is detected (control method 2). When the control method 2 is employed, the motor control circuit 8 switches the modulation scheme of the inverter circuit 4 from the three-phase modulation scheme to the two-phase modulation scheme when the abnormality in the first power supply system 21 is detected.

A power P supplied by the second power supply system 22 to the gate driving circuit 12 can be represented by the following formula [1], where $Q_g$ denotes a gate capacitance of the switching element of the inverter circuit 4, $V_g$ denotes a gate drive voltage, T denotes one period of a fundamental wave of the output current of the inverter circuit 4, and n denotes a number of times switching is performed in one period of the fundamental wave of the output current of the inverter circuit 4.

$$P = Q_g \times V_g \times n / T \qquad [1]$$

According to the formula [1], by reducing the number of times the switching is performed by the switching element per unit time, the power P supplied from the second power supply system 22 to the gate driving circuit 12 can be reduced. In other words, by implementing the control method 1 for reducing a carrier frequency of the PWM, or the control method 2 for performing the two-phase modulation, the number of times the switching is performed per unit time is reduced, and thus, the power P supplied from the second power supply system 22 to the gate driving circuit 12 can be reduced.

Figure 2:
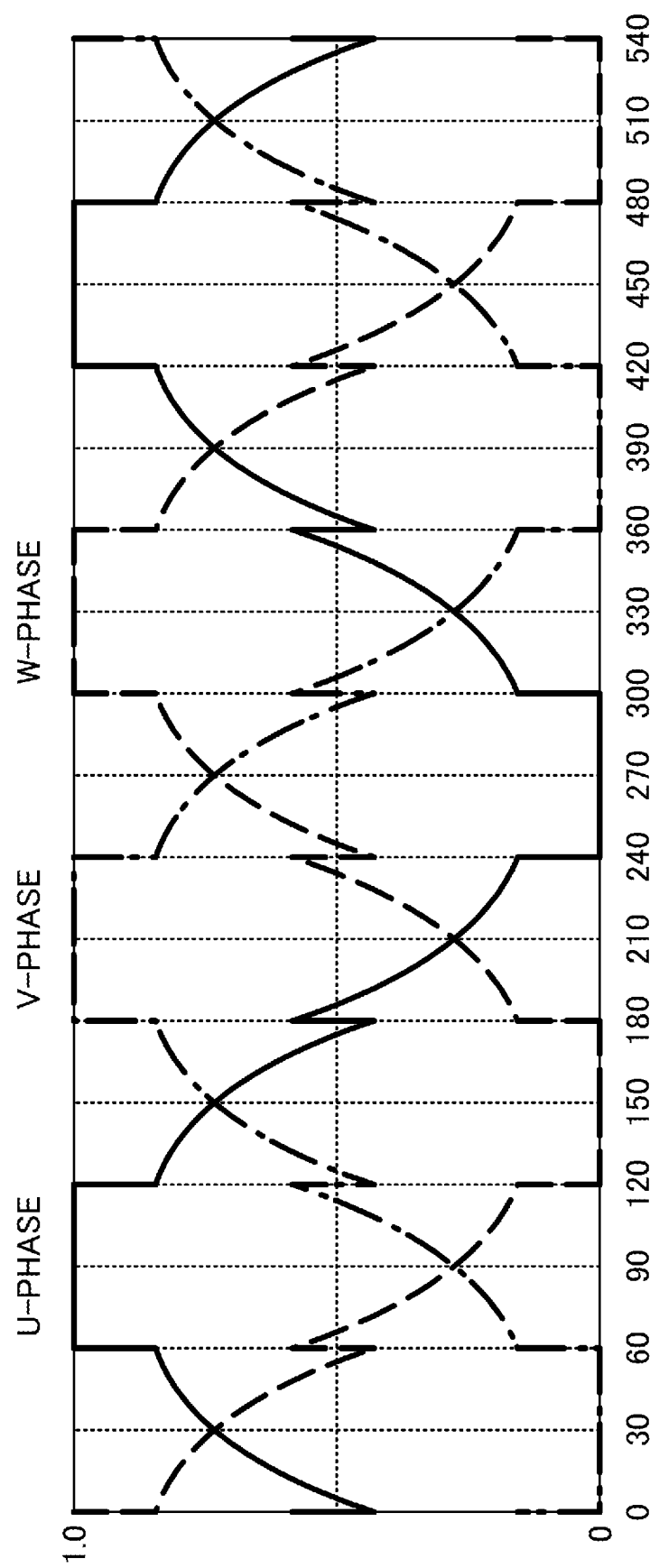
FIG. 2 is a diagram illustrating an example of a two-phase modulated voltage command.

FIG. 2 illustrates an example of the two-phase modulated voltage command. The two-phase modulation scheme is a method which fixes a signal wave of one phase among signal waves of three phases that are compared with the modulation wave to 1 (high level) or 0 (low level), and modulates the signal waves of the remaining two phases, in PWM control. Accordingly, because the two-phase modulation scheme reduces the number of times the switching is performed per unit time compared to the three-phase modulation scheme, the power P supplied from the second power supply system 22 to the gate driving circuit 12 can be reduced.

In FIG. 1, when the abnormality in the first power supply system 21 is detected, the control circuit 7 may continue the gate drive of the plurality of switching elements u, v, w, x, y, and z at a gate power supply voltage lower than that before the abnormality is detected (control method 3). According to the formula [1] described above, the power P supplied from the second power supply system 22 to the gate driving circuit 12 can be reduced, by decreasing the gate drive voltage $V_g$. Accordingly, when the abnormality is detected, the gate driving circuit 12 of the control circuit 7 decreases the gate power supply voltage for the gate drive of the plurality of switching elements u, v, w, x, y, and z compared to that before the abnormality is detected. When the gate power supply voltage decreases, the gate drive voltage $V_g$ also decreases, thereby reducing the power P supplied from the second power supply system 22 to the gate driving circuit 12.

When the control method 3 is employed, the motor control circuit 8 preferably reduces a current limit value or a torque limit value of the motor 100 when an abnormality in the first power supply system 21 is detected (for example, when the abnormality detection signal EM is input). Generally, by decreasing the gate power supply voltage, that is, the gate drive voltage, a loss of the switching elements u, v, w, x, y, and z increases and a switching element temperature rises. For this reason, it is possible to prevent rising of the switching element temperature, by reducing the current limit value or the torque limit value.

Figure 3:
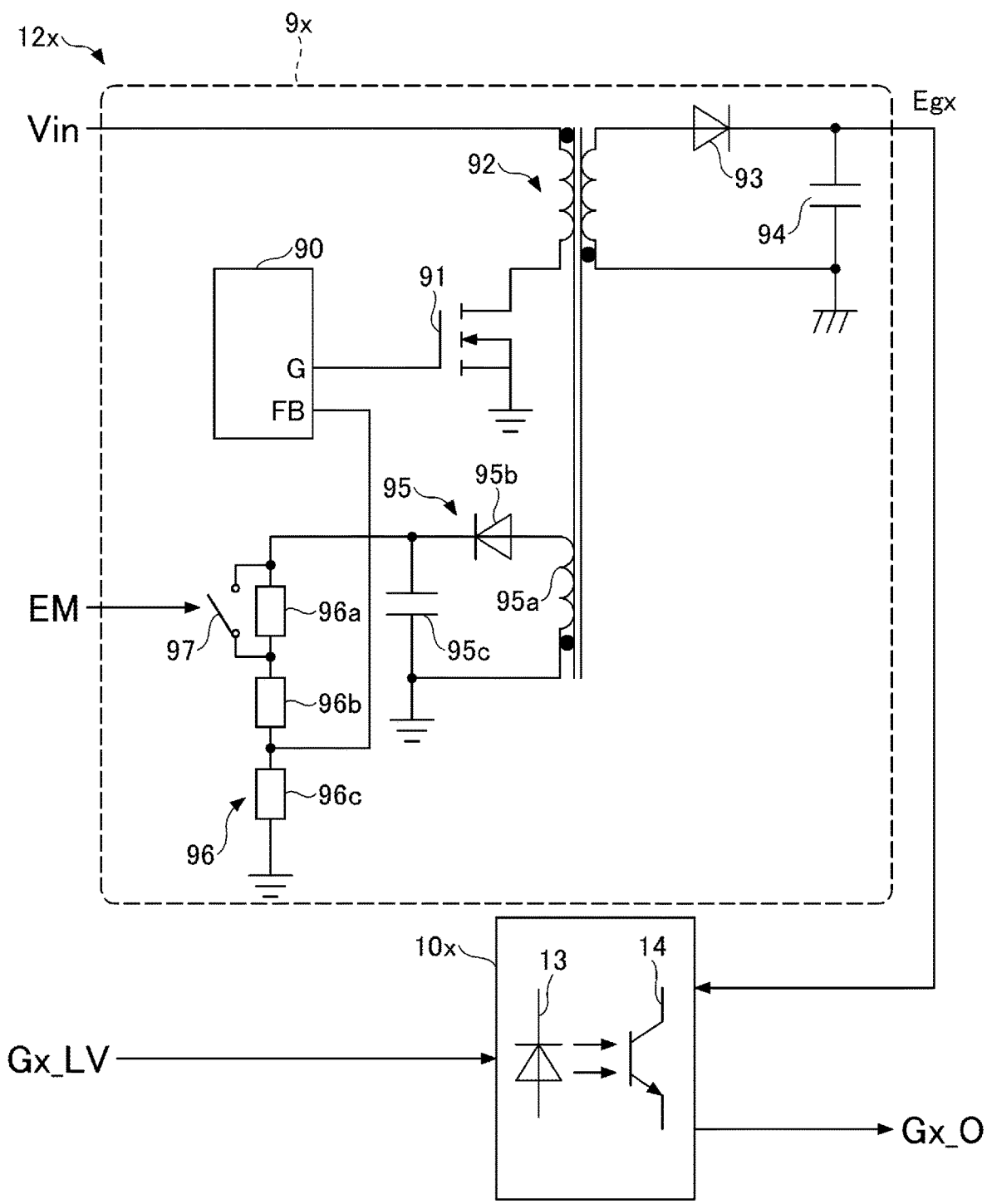
FIG. 3 is a diagram illustrating a first configuration example of a gate driving circuit.

FIG. 3 is a diagram illustrating a first configuration example of the gate driving circuit, and illustrates a gate driving circuit 12x, which is one of the plurality of gate driving circuits. Other gate driving circuits, such as the gate driving circuit 12u or the like, have a configuration similar to that of the gate driving circuit 12x. The gate driving circuit 12x illustrated in FIG. 3 includes a buffer circuit 10x provided with an isolation function between input and output, and a gate power supply circuit 9x that is a power supply for the buffer circuit 10x.

The gate power supply circuit 9x is formed by a flyback converter in this example. The gate supply circuit 9x divides an output voltage thereof, and performs a feedback control to adjust a gate power supply voltage Egx to a first value. The buffer circuit 10x supplies the gate power supply voltage Egx to the gate of the switching element x of the inverter circuit 4, as a gate drive voltage Gx_O. The gate power supply circuit 9x switches the gate power supply voltage Egx to a second value lower than the first value, when the abnormality detection signal EM is input thereto. Accordingly, when the abnormality in the first power supply system 21 is detected, the gate driving circuit 12x can continue the gate drive of the switching element x at the gate power supply voltage Egx (gate drive voltage Gx_O) lower than that before the abnormality is detected.

The gate power supply circuit 9x includes a drive control integrated circuit (IC) 90, a transistor 91, a transformer 92, a diode 93, a capacitor 94, a feedback circuit 95, a voltage divider circuit 96, and a switch 97. The feedback circuit 95 includes a coil 95a, a diode 95b, and a capacitor 95c. The voltage divider circuit 96 includes a plurality of resistive elements 96a, 96b, and 96c connected in series. The switch 97 is connected in parallel to the resistive element 96a, in a manner capable of bypassing the resistive element 96a. The drive control IC 90 includes a gate terminal G for outputting a gate signal that drives the transistor 91, and a feedback terminal FB for receiving a feedback voltage that is obtained by dividing a voltage output from the feedback circuit 95 by a resistance voltage-dividing in the voltage divider circuit 96.

The drive control IC 90 drives the transistor 91 so that the feedback voltage is maintained at a reference voltage, thereby adjusting the gate power supply voltage Egx to the first value. When the abnormality detection signal EM is input, the switch 97 is turned on, and thus, a voltage dividing ratio of the voltage divider circuit 96 varies. In this example, the drive control IC 90 drives the transistor 91 so that the gate power supply voltage Egx decreases, because the feedback voltage increases when the switch 97 is switched from the off state to the on state. Accordingly, the gate power supply circuit 9x can switch the gate power supply voltage Egx to the second value lower than the first value, when the abnormality detection signal EM is input.

The buffer circuit 10x includes a photocoupler 13 configured to isolate the input and output, and a complementary output circuit 14 configured to output the gate drive voltage Gx_O from the signal output from the photocoupler 13 according to the input drive command Gx_LV. The buffer circuit 10x outputs the gate power supply voltage Egx supplied from the gate power supply circuit 9x, as a high-level gate drive voltage Gx_O output from the complementary output circuit 14.

Figure 4:
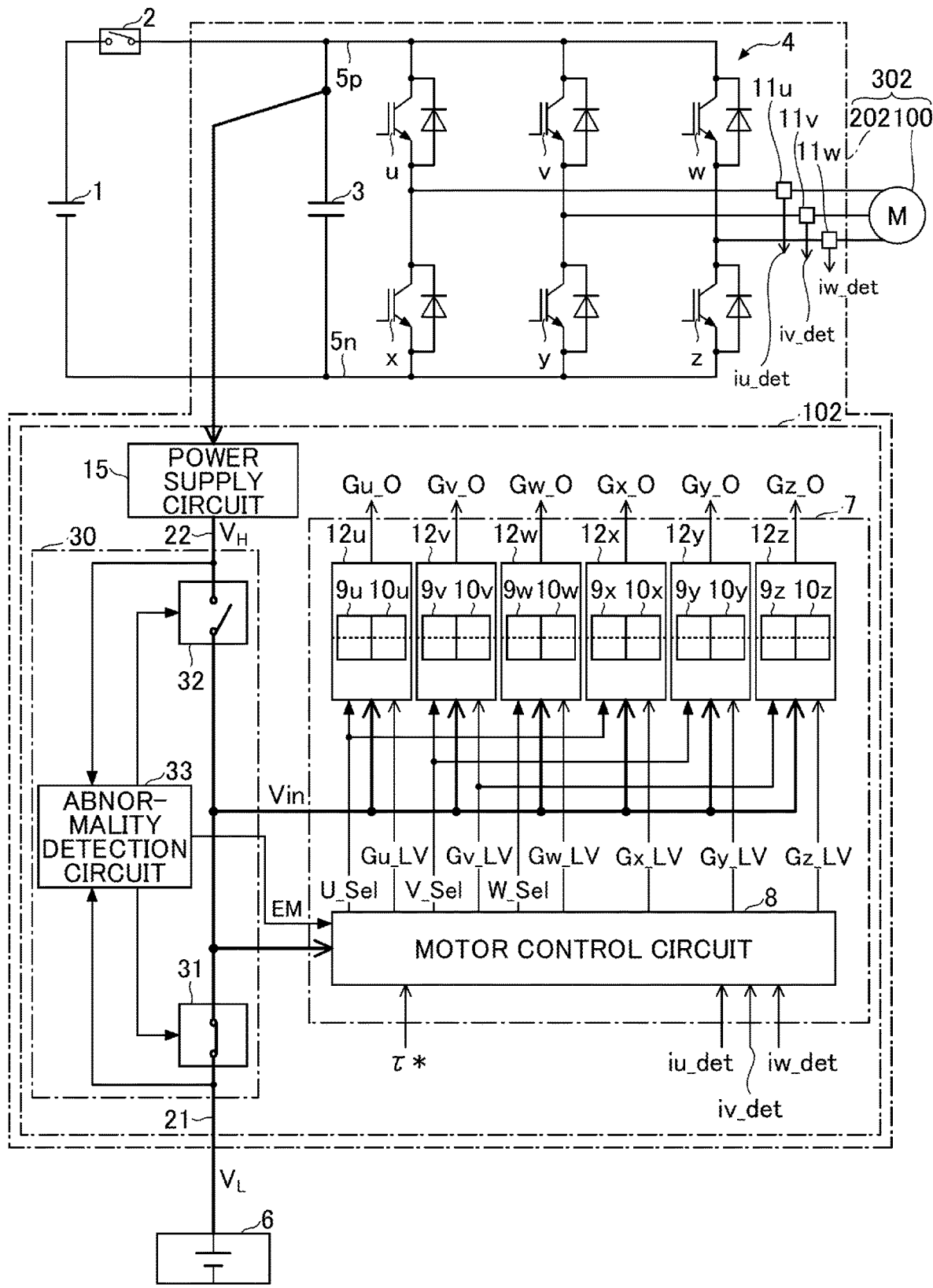
FIG. 4 is a diagram illustrating a configuration example of the motor driving system according to a second embodiment.

FIG. 4 is a diagram illustrating a configuration example of the motor driving system according to a second embodiment. In the second embodiment, a description of the configuration and effects similar to those of the first embodiment will be omitted or simplified by incorporating the description given above.

The motor control circuit 8 reduces the current limit value or the torque limit value, based on the abnormality detection signal EM. When the motor control circuit 8 receives the abnormality detection signal EM, the motor control circuit 8 detects a phase in which an absolute value of an instantaneous value of the motor current is a maximum among the three phases. The gate driving circuit 12 drives the gate of the switching element belonging to the phase in which the absolute value is the maximum, at a first gate power supply voltage, and drives the gate of the switching element belonging to a phase different from the phase in which the absolute value is the maximum, at a second gate power supply voltage lower than the first gate power supply voltage (control method 4A). In this case, the gate power supply voltages of the two phases among the three phases are always the second value lower than the first value. Because the gate drive voltage Vg also decreases when the gate power supply voltage decreases, the power P supplied from the second power supply system 22 to the gate driving circuit 12 can be reduced according to the formula [1] described above.

Figure 5:
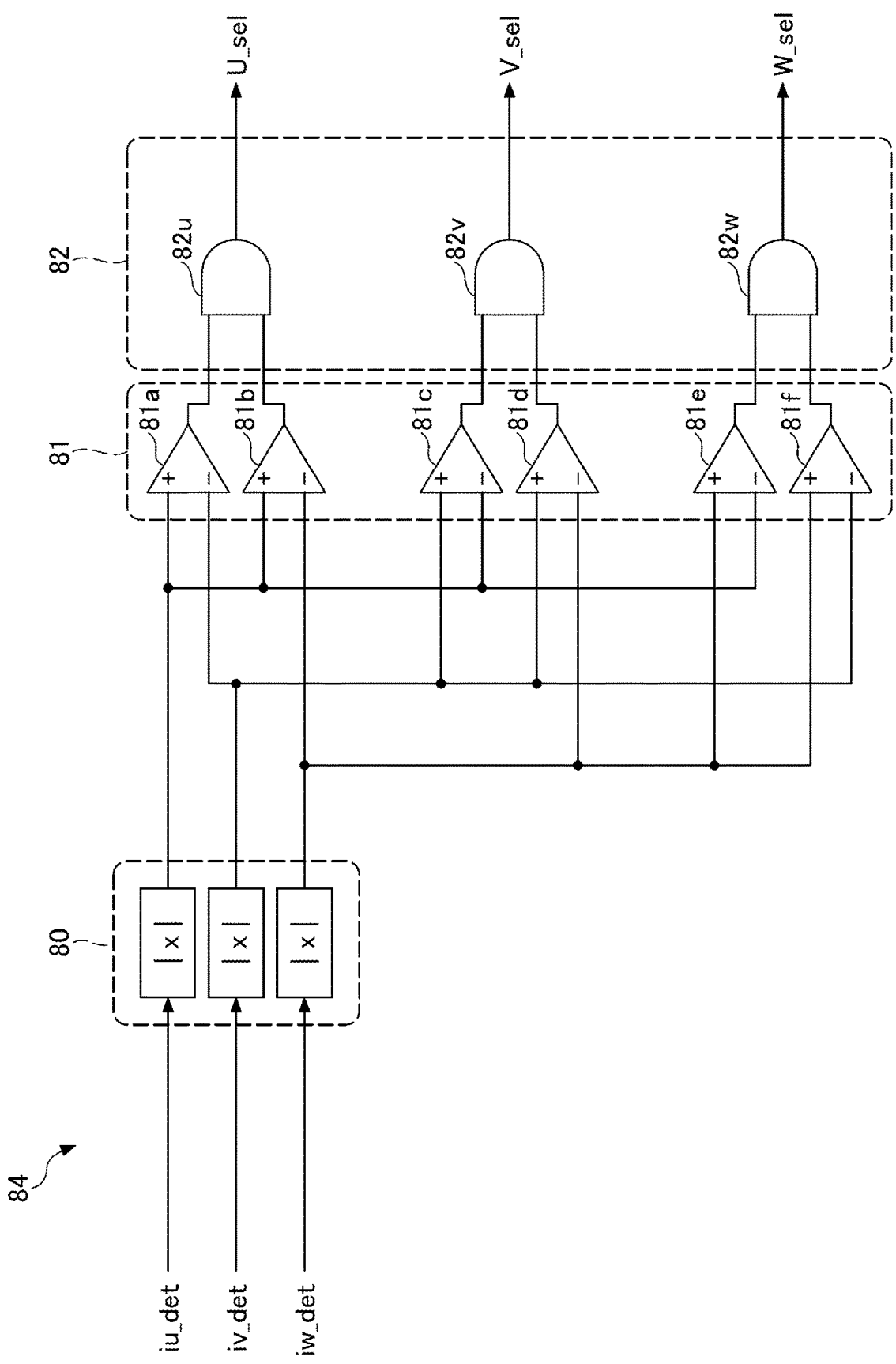
FIG. 5 is a diagram illustrating an example of a detection circuit that detects a phase in which an absolute value of an instantaneous value of a motor current is a maximum, among three phases.

FIG. 5 is a diagram illustrating an example of the detection circuit that detects the phase in which the absolute value of the instantaneous value of the motor current is the maximum, among the three phases. The motor control circuit 8 includes a detection function represented by a detection circuit 84 illustrated in FIG. 5. The detection circuit 84 includes an absolute value circuit 80, a comparator circuit 81, and a logic circuit 82. The absolute value circuit 80 detects the absolute value of the instantaneous value of the motor current of each phase, by computing the absolute value of detection values (iu_det, iv_det, and iw_det) of the motor current of each phase detected by the current sensors 11u, 11v, and 11w. The comparator circuit 81 includes a plurality of comparators 81a, 81b, 81c, 81d, 81e, and 81f that receive outputs of the absolute value circuit 80 in a manner illustrated in FIG. 5. The logic circuit 82 includes a logical product circuit 82u configured to output a logical product of outputs of the comparators 81a and 81b, a logical product circuit 82v configured o output a logical product of outputs of the comparators 81c and 81d, and a logical product circuit 82w configured to output a logical product of outputs of the comparators 81e and 81f. The logical product circuits 82u, 82v, and 82w of the logic circuit 82 output selection signals U_Sel, V_Sel, and W_Sel, respectively. The detection circuit 84 has such a configuration, so that the selection signal corresponding to the phase in which the absolute value of the instantaneous value of the motor current is the maximum among the three phases has a high level, and the selection signals corresponding to the other phases have a low level.

Figure 6:
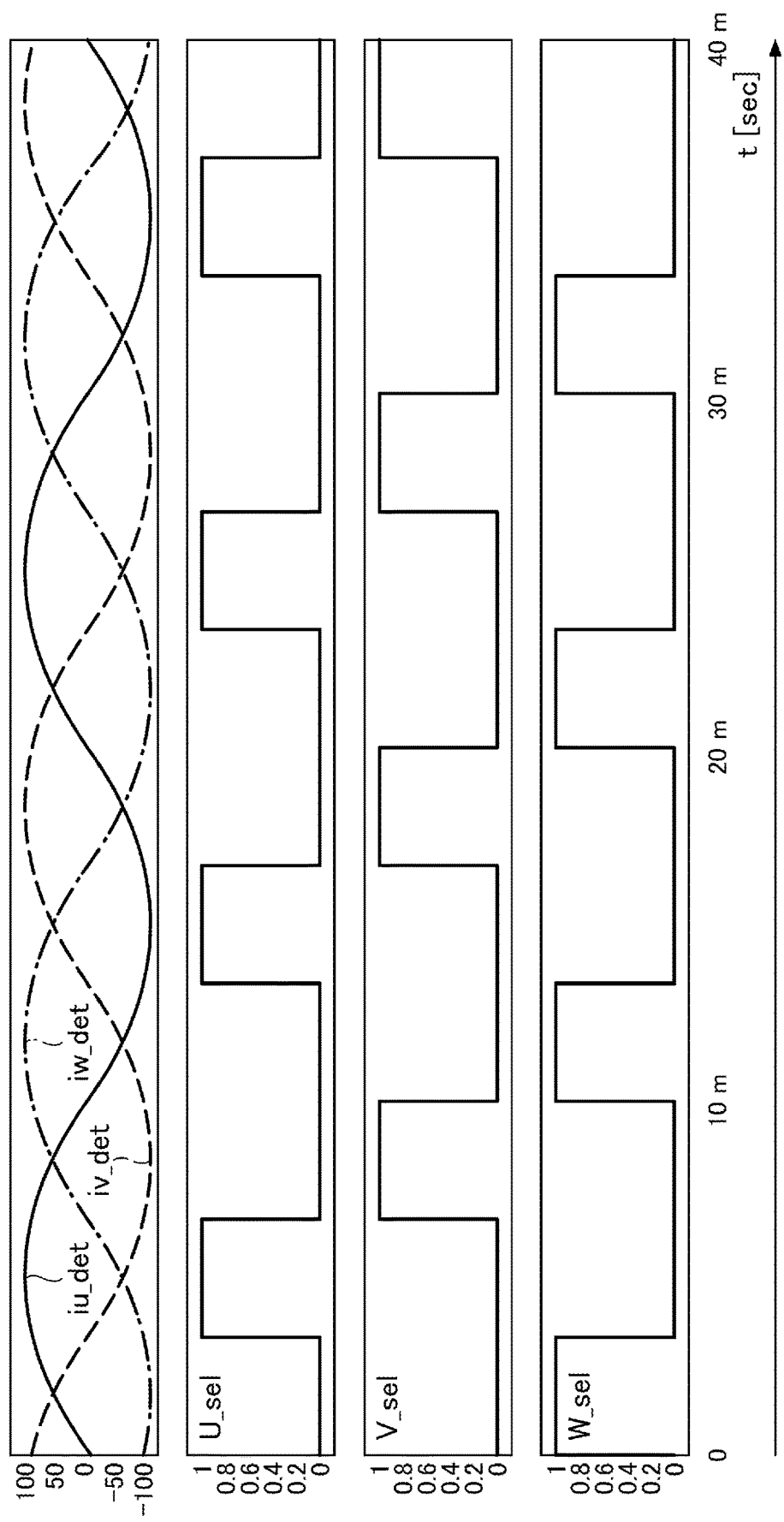
FIG. 6 is a waveform diagram illustrating a first operation example of the motor driving system according to a second embodiment.

FIG. 6 is a waveform diagram illustrating a first operation example of the motor driving system according to a second embodiment. The motor control circuit 8 detects the phase in which the absolute value of the instantaneous value of the motor current is the maximum among the three phases, based on the detection value (iu_det, iv_det, and iw_det) of the motor current of each phase. The motor control circuit 8 sets the selection signals U_Sel, V_Sel, and W_Sel, corresponding to the phase in which the absolute value is the maximum, to the high level. Among the plurality of gate driving circuits 12, two gate driving circuits (the gate driving circuits of the upper and lower arms of the phase in which the absolute value is the maximum) that receive the high-level selection signal, set the gate power supply voltage to the first value, and the remaining four gate driving circuits set the gate power supply voltage to the second value lower than the first value (control method 4A).

The gate drive voltage Vg also decreases when the gate power supply voltage decreases. Hence, according to the formula [1] described above, the power P supplied from the second power supply system 22 to the gate driving circuit 12 can be reduced by performing the control according to the control method 4A. Next, this point will be described in more detail. with reference to FIG. 7 and FIG. 8.

Figure 7:
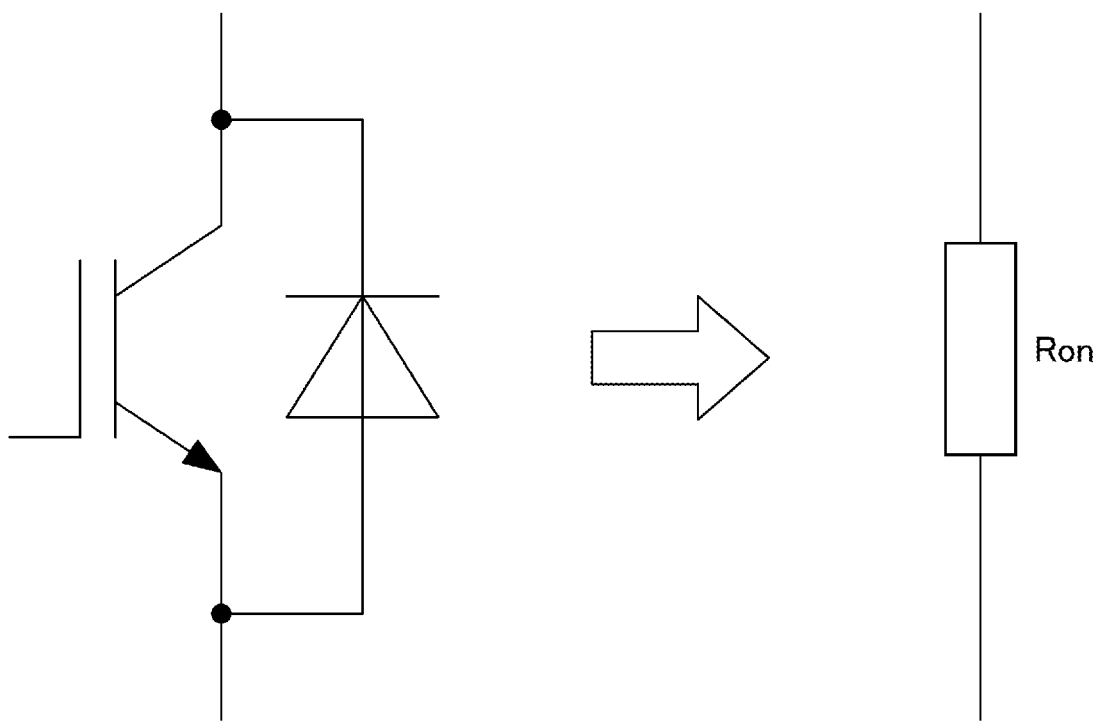
FIG. 7 is a diagram for explaining an on-resistance of a switching element.
Figure 8:
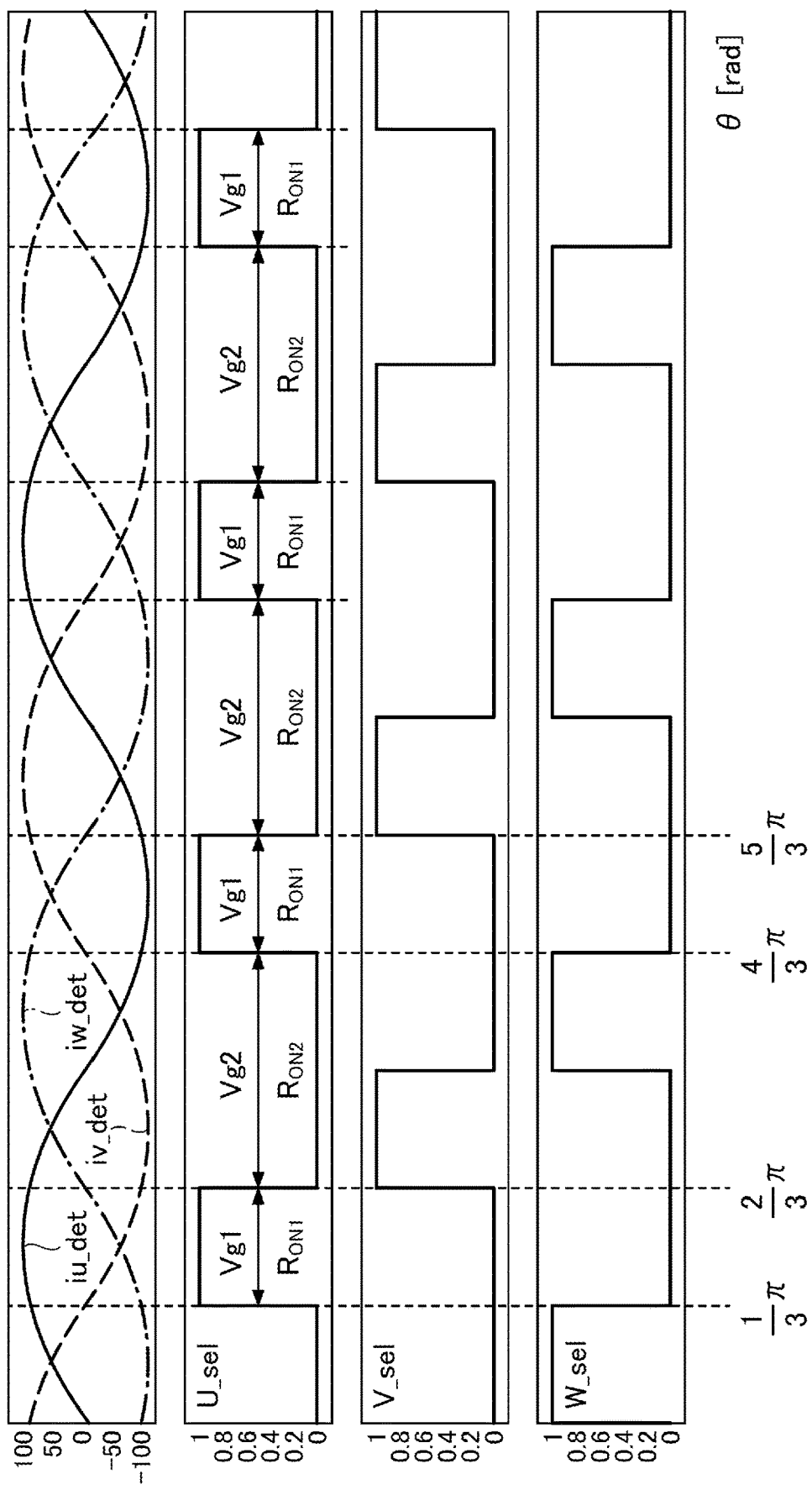
FIG. 8 is a diagram illustrating a relationship of the first operation example of the motor driving system according to the second embodiment, a gate drive voltage of the switching element, and the on-resistance of the switching element.

FIG. 7 is a diagram for explaining an on-resistance of the switching element. FIG. 8 is a diagram illustrating a relationship of the first operation example of the motor driving system according to the second embodiment, the gate drive voltage of the switching element, and the on-resistance of the switching element. The switching element in a state where the gate is on (that is, a gate-on state) can be regarded as a resistance element having an on-resistance value Ron in FIG. 7. In FIG. 8, $R_{ON1}$ denotes an on-resistance value under a condition in which a first gate voltage Vg1 is applied, and $R_{ON2}$ denotes an on-resistance value under a condition in which a second gate voltage Vg2 lower than the first gate voltage Vg1 (that is, Vg1>Vg2) is applied. Generally, semiconductor switching elements have characteristics such that the on-resistance value $R_{ON1}$ is lower than the on-resistance value $R_{ON2}$. On the other hand, an instantaneous loss $d\theta P_{RON}$ generated by a sinusoidal current Iu·sin θ flowing through the resistive element can be represented by the following formula [2].

$$d\theta_{PRON} = (Iu \cdot \sin \theta)^2 \cdot d\theta \cdot \text{Ron} \qquad [2]$$

As may be seen from the formula [2], the instantaneous loss is proportional to the square of the instantaneous value (instantaneous current) of the sinusoidal current.

Next, as illustrated in FIG. 8, in the case of a U-phase current, the absolute value of the instantaneous value of the U-phase current becomes the maximum among the absolute values of the instantaneous values of the currents of all phases, in specific periods of time from (1/3)π to (2/3)π, and from (4/3)π to (5/3)π.

Accordingly, by driving at the gate voltage Vg1 only in these specific periods of time, it is possible to reduce the power P (refer to formula [1]) supplied from the second power supply system 22 to the gate driving circuit 12, while effectively reducing an average loss, when compared to driving at the gate voltage Vg2 in all of the periods of time. The same applies to the V-phase and the W-phase.

Next, another operation example in the second embodiment illustrated in FIG. 4 will be described.

The motor control circuit 8 decreases the current limit value or the torque limit value, based on the abnormality detection signal EM. When the abnormality detection signal EM is received, the motor control circuit 8 detects the phase in which the absolute value of the instantaneous value of the motor current is a minimum among the three phases. The gate driving circuit 12 drives the gate of the switching element belonging to the phase in which the absolute value is the minimum, at the first gate power supply voltage, and drives the gate of the switching element belonging to a phase different from the phase in which the absolute value is the minimum, at the first gate power supply voltage higher than the first gate power supply voltage (control method 4B). In this case, the gate power supply voltage of one phase among the three phases is always the second value lower than the first value. Because the gate drive voltage Vg also decreases when the gate power supply voltage decreases, the power P supplied from the second power supply system 22 to the gate driving circuit 12 can be reduced according to the formula [1] described above.

Figure 9:
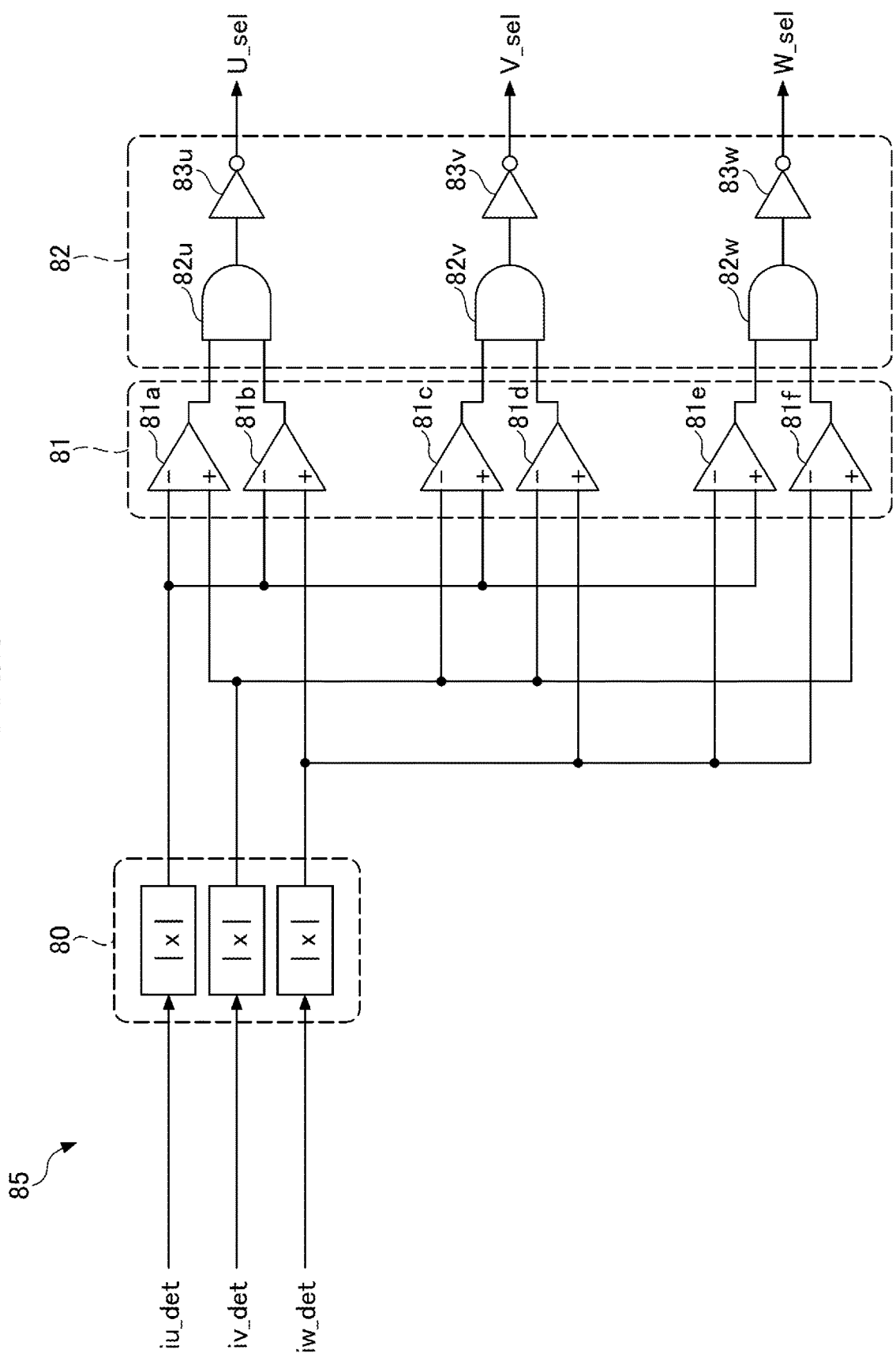
FIG. 9 is a diagram illustrating an example of a detection circuit for detecting a phase in which the absolute value of the instantaneous value of the motor current is a minimum, among three phases.

FIG. 9 is a diagram illustrating an example of the detection circuit for detecting the phase in which the absolute value of the instantaneous value of the motor current is the minimum, among three phases. The motor control circuit 8 includes a detection function represented by a detection circuit 85 illustrated in FIG. 9. The detection circuit 85 includes an absolute value circuit 80, a comparator circuit 81, and a logic circuit 82. The detection circuit 85 illustrated in FIG. 9 differs from the detection circuit 84 illustrated in FIG. 5 in that the logic circuit 82 illustrated in FIG. 9 further includes inverter circuits 83u, 83v, and 83w. The inverter circuits 83u, 83v, and 83w output selected signals U_Sel, V_Sel, and W_Sel obtained by inverting levels of the signals output from the corresponding logical product circuits 82u, 82v, and 82w, respectively. The detection circuit 84 has such a configuration, so that the selection signal corresponding to the phase in which the absolute value of the instantaneous value of the motor current is the minimum among the three phases has a low level, and the selection signals corresponding to the other phases have a high level.

Figure 10:
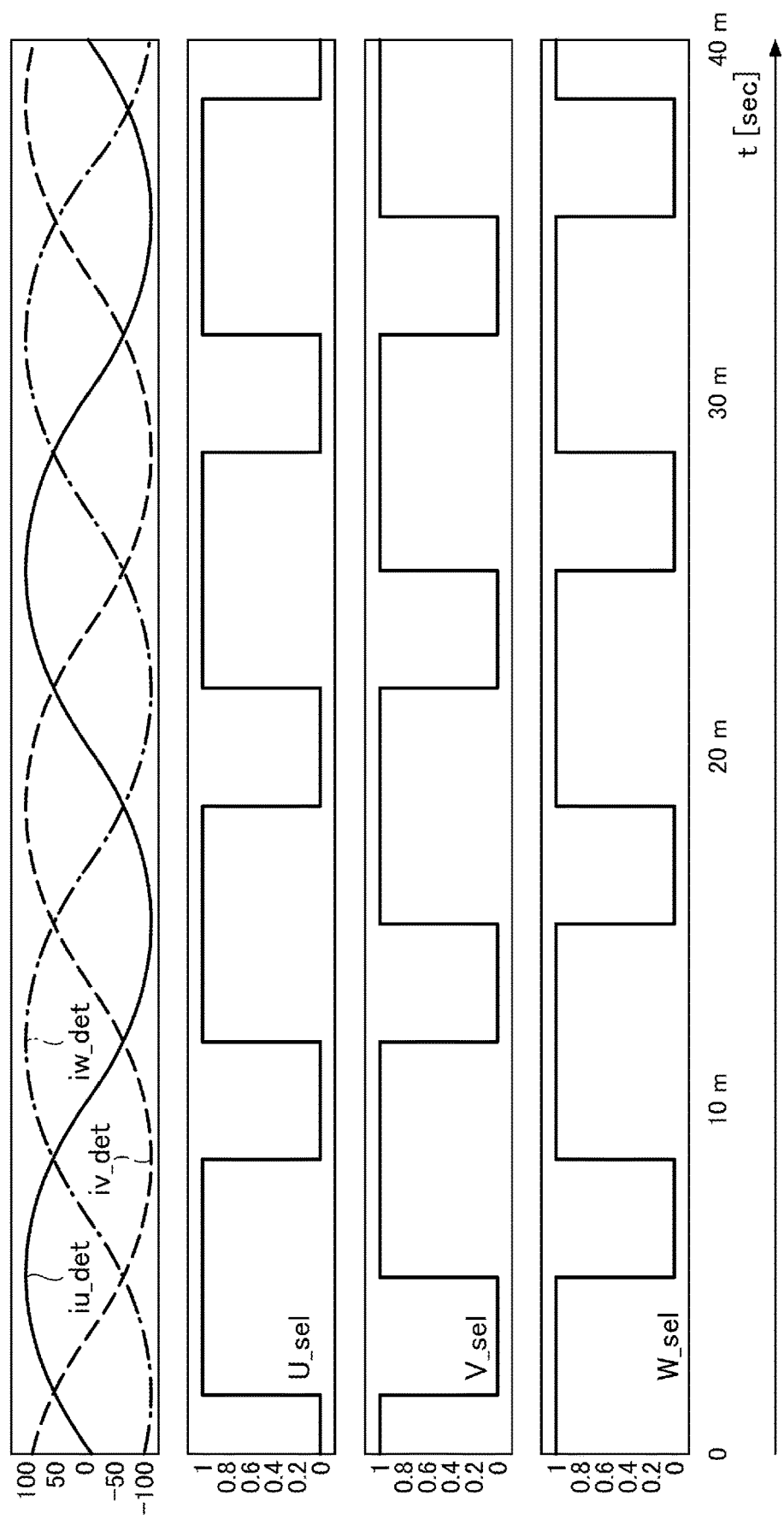
FIG. 10 is a waveform diagram illustrating a second operation example of the motor driving system according to the second embodiment.

FIG. 10 is a waveform diagram illustrating a second operation example of the motor driving system according to the second embodiment. The motor control circuit 8 detects the phase in which the absolute value of the instantaneous value of the motor current is the minimum among the three phases, based on the detection value (iu_det, iv_det, and iw_det) of the motor current of each phase. The motor control circuit 8 sets the selection signals U_Sel, V_Sel, and W_Sel, corresponding to the phase in which the absolute value is the minimum, to the low level. Among the plurality of gate driving circuits 12, two gate driving circuits (the gate driving circuits of the upper and lower arms of the phase in which the absolute value is the minimum) that receive the low-level selection signal, set the gate power supply voltage to the second value, and the remaining four gate driving circuits set the gate power supply voltage to the first value higher than the second value (control method 4B).

The gate drive voltage Vg also decreases when the gate power supply voltage decreases. Hence, according to the formula [1] described above, the power P supplied from the second power supply system 22 to the gate driving circuit 12 can be reduced by performing the control according to the control method 4B. More particularly, by driving at the gate voltage Vg1 only during specific periods of time, it is possible to reduce the power P (refer to formula [1]) supplied from the second power supply system 22 to the gate driving circuit 12, while effectively reducing the average loss, when compared to driving at the gate voltage Vg2 in all of the periods of time.

Figure 11:
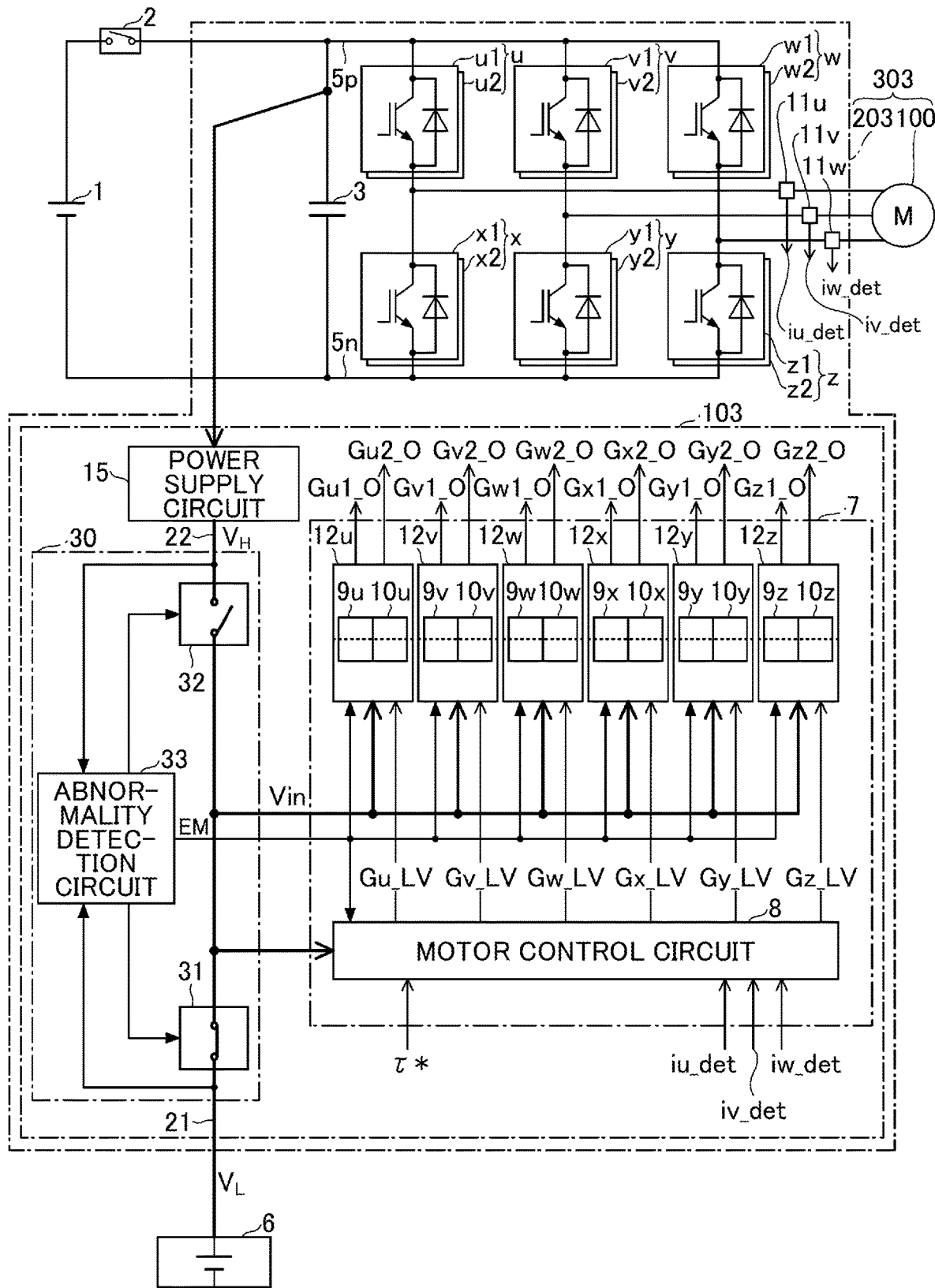
FIG. 11 is a view illustrating a configuration example of the motor driving system according to a third embodiment.

FIG. 11 is a diagram illustrating an example of the configuration of the motor driving system according to a third embodiment. In the third embodiment, a description of the configuration and effects similar to those of the first and second embodiments will be omitted or simplified by incorporating the description given above.

In the third embodiment, the plurality of switching elements u, v, w, x, y, and z are the elements formed by multiple switching elements connected in parallel, respectively. In this example, the switching element u is formed by multiple switching elements u1 and u2 connected in parallel. The multiple switching elements u1 and u2 have the same configuration as each other. Other switching elements v, w, x, y, and z have the same configuration as the switching element u. The switching element v is formed by multiple switching elements v1 and v2, and the switching element w is formed by multiple switching elements w1 and w2. The switching element x is formed by multiple switching elements x1 and x2, the switching element y is formed by multiple switching elements y1 and y2, and the switching element z is famed by multiple switching elements z1 and z2.

The motor control circuit 8 reduces the current limit value or the torque limit value, based on the abnormality detection signal EM. When the motor control circuit 8 receives the abnormality detection signal EM, in a state where one or more switching elements forming a portion of the multiple switching elements are off in each of the plurality of switching elements u, v, w, x, y, and z, the control circuit 8 switches remaining switching elements of the multiple switching elements in each of the plurality of switching elements u, v, w, x, y, and z (control method 5A). Because the gate capacitance Qg in the formula [1] described above decreases when the number of switching elements driven in parallel is reduced, it is possible to reduce the power P supplied from the second power supply system 22 to the gate driving circuit 12.

Figure 12:
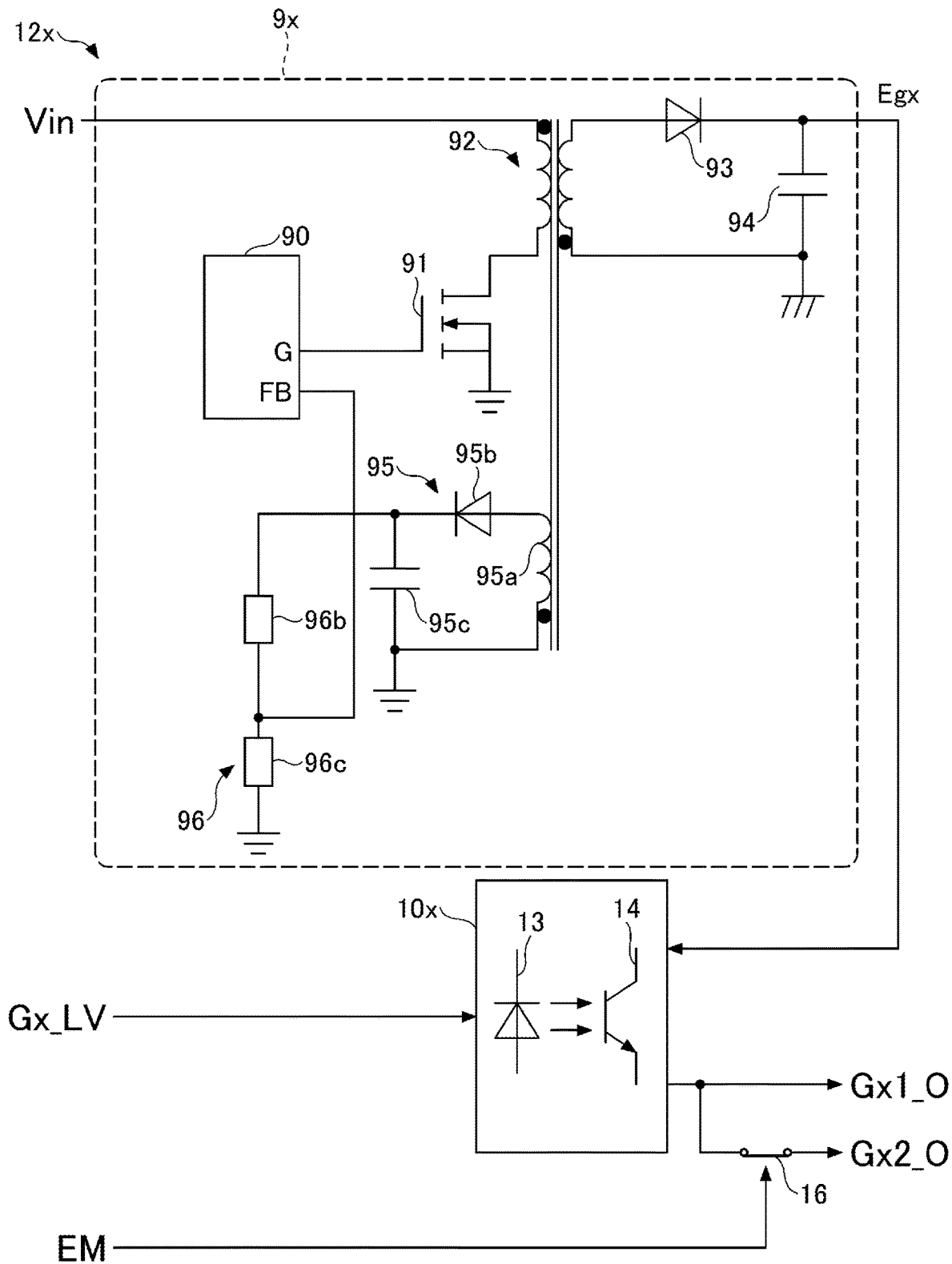
FIG. 12 is a diagram illustrating a second configuration example of the gate driving circuit.
Figure 13:
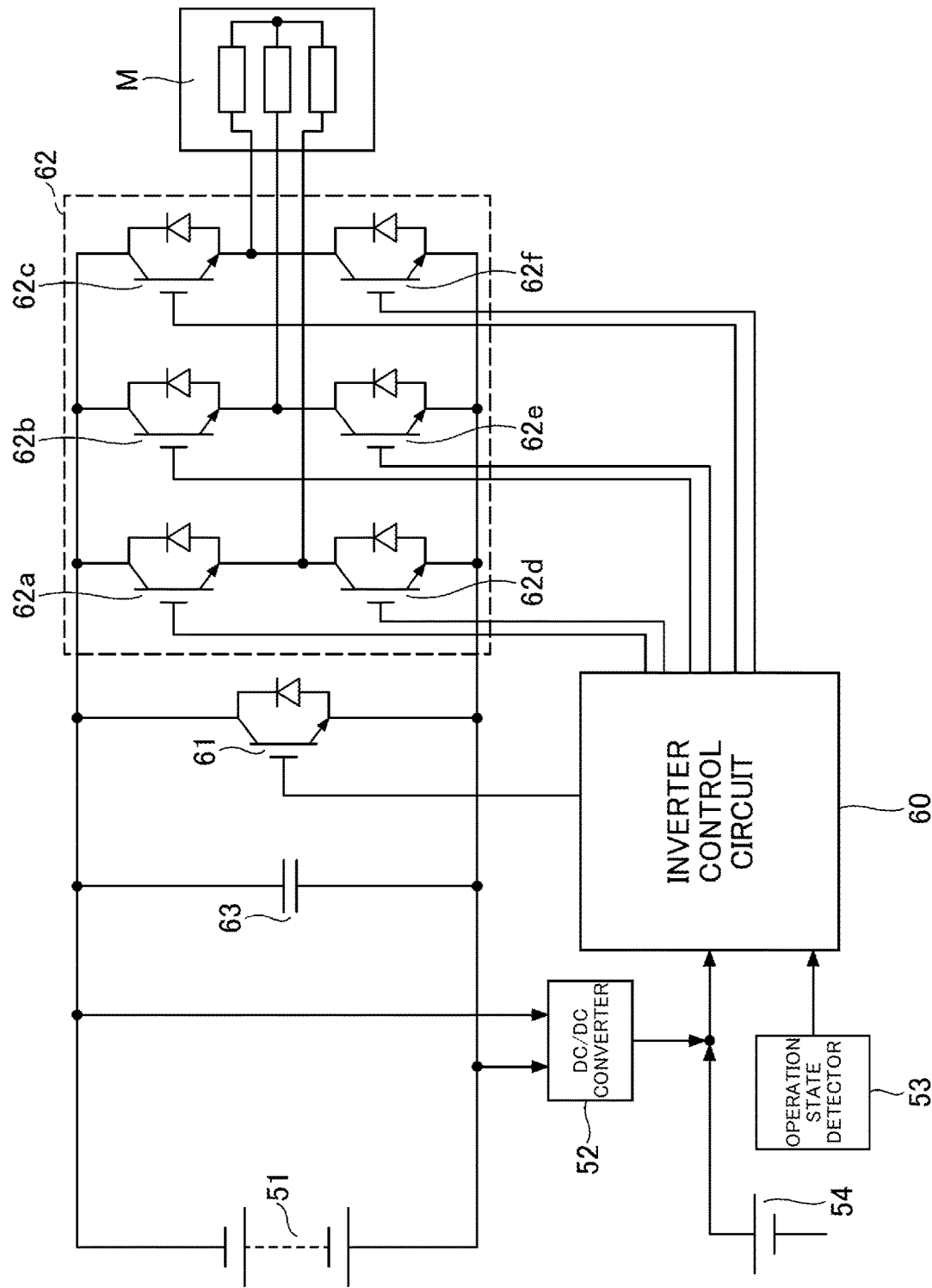
FIG. 13 is a circuit diagram of a motor driving system disclosed in Patent Document 1.

FIG. 12 is a diagram illustrating a second configuration example of the gate driving circuit. FIG. 12 illustrates one gate driving circuit 12x, which is one of the plurality of gate driving circuits. Other gate driving circuits, such as the gate driving circuit 12u or the like, have a configuration similar to that of the gate driving circuit 12x. The gate driving circuit 12x illustrated in FIG. 12 includes a buffer circuit 10x provided with an isolation function between input and output, and a gate power supply circuit 9x that is a power supply for the buffer circuit 10x. The gate driving circuit 12x illustrated in FIG. 12 differs from the gate driving circuit 12x illustrated in FIG. 3 in that the gate driving circuit 12x illustrated in FIG. 12 includes a switch 16. Further, the configuration of FIG. 12 differs from the configuration of FIG. 3, in that the switch 97 and the resistive element 96a illustrated in FIG. 3 is not provided in FIG. 12.

In FIG. 12, when the abnormality detection signal EM is input, the supply of the gate drive voltage Gx2_O from the buffer circuit 10x to the gate of the switching element x2 is cut off by the switch 16. Thus, the switching element x2 is fixed to the off state, while the switching element x1 is turned on or off (switched) according to the gate drive voltage Gx1_O. Hence, according to the control method 5A, because the number of switching elements driven in parallel is reduced, the power P supplied from the second power supply system 22 to the gate driving circuit 12 can be reduced.

The control method 5A may fix the switching elements belonging to a specific portion of the phases to the off state, instead of uniformly fixing a portion of the switching elements belonging to all of the phases to the off state. For example, a portion of the switching elements that are fixed to the off state may be switching elements belonging to a phase different from the phase in which the absolute value of the instantaneous value of the motor current is the maximum, among the multiple switching elements connected in parallel (control method 5B). Alternatively, a portion of the switching elements that are fixed to the off state may be switching elements belonging to the phase in which the absolute value of the instantaneous value of the motor current is the minimum, among the multiple switching elements connected in parallel (control method 5C). According to the control method 5B or 5C, it is possible to reduce the power P (refer to formula [1]) supplied from the second power supply system 22 to the gate driving circuit 12, while effectively reducing the average loss, when compared to the control method 5A which uniformly fixes a portion of the switching elements belonging to all of the phases to the off state.

According to each aspect of the present disclosure, the motor can continue to operate in the event of the abnormality in the first power supply system.

While embodiments have been described, the techniques of the present disclosure are not limited to the those of the embodiments described above. Various variations and modifications, such as combinations and substitutions of a portion or entirety of the other embodiments, are possible.

For example, the control circuit 7 may perform a combination of at least a portion of the plurality of control methods described above. In addition, the motor 100 is not limited to the motor for the vehicle, and may be a motor for other industrial use, such as a motor for elevators, or the like.

What is claimed is:

1. A control device comprising:
   a control circuit configured to control an inverter circuit that drives a motor by a plurality of switching elements coupled between DC buses;
   a first power supply system using a voltage source different from the DC buses as a power supply;
   a second power supply system using the DC buses as a power supply; and
   a switching circuit configured to switch a power supply system that supplies power to the control circuit from the first power supply system to the second power supply system when an abnormality in the first power supply system is detected, wherein
   the control circuit continues control of the inverter circuit with a power consumption lower than that before the abnormality is detected in the first power supply system, when the abnormality is detected,
   each of the plurality of switching elements is formed by multiple switching elements coupled in parallel, and
   in a state Where one or more switching, elements forming a portion of the multiple switching elements are off in each of the plurality of switching elements, the control circuit switches remaining switching elements of the multiple switching elements in each of the plurality of switching elements, when the abnormality is detected.

2. The control device as claimed in claim 1, wherein the switching circuit receives power from at least one of the first power supply system and the second power supply system.

3. The control device as claimed in claim 2, wherein the power supply system that supplies power to the switching circuit is switched from the first power supply system to the second power supply system when the abnormality is detected.

4. The control device as claimed in claim 1, wherein the switching circuit includes
   an abnormality detection circuit configured to detect the abnormality,
   a first switch configured to disconnect a power supply path between the first power supply system and the control circuit when the abnormality is detected by the abnormality detection circuit, and
   a second switch configured to connect a power supply path between the second power supply system and the control circuit when the abnormality is detected by the Abnormality detection circuit.

5. The control device as claimed in claim 1, wherein the switching circuit detects an abnormal drop in a voltage of the first power supply system as the abnormality in the first power supply system.

6. The control device as claimed in claim 1, wherein the control circuit continues the control of the inverter circuit with a modulation scheme having a power consumption lower than that before the abnormality is detected, when the abnormality is detected.

7. The control device as claimed in claim 6, wherein the modulation scheme is a pulse width modulation scheme having a lower frequency than that before the abnormality is detected.

8. The control device as claimed in claim 6, wherein the modulation scheme is a two-phase modulation scheme.

9. The control device as claimed in claim 1, wherein the one or more switching elements forming the portion of the multiple switching elements belong to a phase different from a phase in which an absolute value of an instantaneous value of a current flowing between the inverter circuit and the motor is a maximum.

10. The control device as claimed in claim 1, wherein the one or more switching elements forming the portion of the multiple switching elements belong to a phase in which an absolute value of an instantaneous value of a current flowing between the inverter circuit and the motor is a minimum.

11. A motor driving apparatus comprising:
the control device as claimed in claim 1; and
the inverter circuit.

12. A motor driving system comprising:
the motor driving apparatus as claimed in claim 11; and
the motor.

13. The motor driving system as claimed in claim 9, wherein the motor is a motor used for running a vehicle.

14. A control device comprising:
a control circuit configured to control an inverter circuit that drives a motor by a plurality of switching elements coupled between DC buses;
a first power supply system using a voltage source different from the DC buses as a power supply;
a second power supply system using the DC buses as a power supply; and
a switching circuit configured to switch a power supply system that supplies power to the control circuit from the first power supply system to the second power supply system when an abnormality in the first power supply system is detected, wherein the control circuit continues control of the inverter circuit With a power consumption lower than that before the abnormality is detected in the first power supply system, when the abnormality is detected, and the control circuit continues gate drive of the plurality of switching elements at a gate power supply voltage lower than that before the abnormality is detected, when the abnormality is detected.

15. The control device as claimed in claim 14, wherein the control circuit drives gates of switching elements belonging to a phase in which an absolute value of an instantaneous value of a current flowing between the inverter circuit and the motor is a maximum at a first gate power supply voltage, and drives gates of switching elements belonging to a phase different from the phase in which the absolute value of the instantaneous value is the maximum at a second gate power supply voltage lower than the first gate power supply voltage, when the abnormality is detected.

16. The control device as claimed in claim 14, wherein the control circuit drives gates of switching elements belonging to a phase in which an absolute value of an instantaneous value of a current flowing between the inverter circuit and the motor is a minimum at a second gate power supply voltage, and drives gates of switching elements belonging to a phase different from the phase in which the absolute value of the instantaneous value is the minimum at a first gate power supply voltage higher than the second gate power supply voltage, when the abnormality is detected.

17. A motor driving apparatus comprising:
the control device as claimed in claim 14; and
the inverter circuit.

18. A motor driving system comprising:
the motor driving apparatus as claimed in claim 17; and
the motor.

19. The motor driving system as claimed in claim 18, wherein the motor is a motor used for running a vehicle.

* * * * *